(12) United States Patent
Shi

(10) Patent No.: US 11,408,962 B2
(45) Date of Patent: Aug. 9, 2022

(54) SMALL SPATIAL SOUND SOURCE ORIENTATION DETECTING DEVICE AND METHOD THEREOF

(71) Applicant: VECSENSE TECHNOLOGY CO., LTD, Shenzhen (CN)

(72) Inventor: Wei Shi, Shenzhen (CN)

( * ) Notice: Subject to any disclaimer, the term of this patent is extended or adjusted under 35 U.S.C. 154(b) by 110 days.

(21) Appl. No.: 16/675,229

(22) Filed: Nov. 6, 2019

(65) Prior Publication Data

US 2020/0072938 A1 Mar. 5, 2020

Related U.S. Application Data

(63) Continuation of application No. PCT/CN2018/083613, filed on Apr. 18, 2018.

(51) Int. Cl.
*G01S 3/803* (2006.01)

(52) U.S. Cl.
CPC .................................. *G01S 3/8038* (2013.01)

(58) Field of Classification Search
CPC .................................................... G01S 3/8038
See application file for complete search history.

(56) References Cited

U.S. PATENT DOCUMENTS 7,146,014 B2 * 12/2006 Hannah ..................... H04R 3/00
381/92
8,638,956 B2 1/2014 Deng 10,547,925 B2 * 1/2020 Kuki ........................... C08J 7/00
2008/0219483 A1 * 9/2008 Klein .......................... H04R 3/06
381/174
2011/0085317 A1 * 4/2011 Nagata ............... H01R 13/6658
361/818
(Continued)

FOREIGN PATENT DOCUMENTS

| CN | 103760520 A | 4/2014 |
| CN | 104049235 A | 9/2014 |
| CN | 106093848 A | 11/2016 |

(Continued)

OTHER PUBLICATIONS

Translation of Description of Liu et al., CN 106526533, 18 pages, machine translated Jun. 10, 2021.from CN original dated 2017. (Year: 2021).*

*Primary Examiner* — Daniel L Murphy

(57) ABSTRACT

The present invention relates to a small spatial sound source orientation detecting device, including a circuit board; three or more MEMS acoustic-electric transducers fixedly arranged on the circuit board and centrosymmetric distribution. The distance between adjacent MEMS acoustic-electric transducers is not more than one-half of the shortest wavelength of the sound source signal; and a micro-control unit, each MEMS acoustic-electric transducer is electrically connected to the micro-control unit respectively. The micro-control unit is to obtain the orientation information of the spatial sound source based on the acoustic signals collected by three or more MEMS acoustic-electric transducers. The present invention also provides a spatial sound source orientation detection method. The small spatial sound source orientation detecting device of the present invention has an ultra-small space size, and can accurately detect the orientation information of the sound source.

15 Claims, 9 Drawing Sheets

(56) References Cited

U.S. PATENT DOCUMENTS

2013/0035935 A1    2/2013   Kim et al.
2017/0188170 A1    6/2017   Prins et al.

FOREIGN PATENT DOCUMENTS

| CN | 106526533 A | 3/2017 |
| CN | 107369460 A | 11/2017 |
| GB | 638292 A | 6/1950 |

\* cited by examiner

SMALL SPATIAL SOUND SOURCE ORIENTATION DETECTING DEVICE AND METHOD THEREOF

CROSS-REFERENCE TO RELATED APPLICATIONS

This application is a continuation of International Patent Application No. PCT/CN2018/083613 with a filing date of Apr. 18, 2018, designating the United States, now pending, and further claims priority to Chinese Patent Application No. 201810276437.6 with a filing date of Mar. 30, 2018. The content of the aforementioned applications, including any intervening amendments thereto, are incorporated herein by reference.

TECHNICAL FIELD

The present invention relates to a field of voice signal processing technology, and in particular to a small spatial sound source orientation detecting device and a method thereof.

BACKGROUND OF THE PRESENT INVENTION

The earliest implementation of the acoustic vector sensor was derived from the submarine sonar application, i.e., the vector hydrophone, which was used to passively detect the sound emitted by the enemy ship and accurately detect its position and distance. Vector hydrophones can be implemented in many ways. The most important implementation in the early days is to suspend a vibration-sensitive vibrator in a liquid, apply elastic constraints around it, and then a rigid protective shell and a porous structure are provided around it to ensure free flow of water. The propagation of sound in a liquid is a directional longitudinal wave that causes the vibration of the aforementioned suspended vibrator. The amplitude of the vibration is the sound pressure, and the direction of the vibration is the direction of the sound. The amplitude and direction of the aforementioned vibration of the suspended vibrator are converted into electrical signals by the elastically constrained structures around the vibrator, which is then amplified by the circuit and converted into an electrical signal. Later, a similar structure was realized in the air, but the outer casing of the structural design could not guarantee the free vibration of the air, making the acoustic vector sensor difficult to implement in the air, not easy to manufacture, and there is no mature implementation method of the MEMS acoustic vector sensor, which is difficult to miniaturize.

The first real implementation of vector sensor technology in the air is the Microflown technology company in the Netherlands, which invented the so-called "microflown sensor". The microflown sensor is designed by two platinum wires that are close to each other and heated to 200 degrees Celsius. Different temperature changes occur when the air passes through the two heated platinum wires, and the sound source information is obtained by detecting the temperature change. The MEMS acoustic vector sensor has the following disadvantages: the preparation process is complicated and the cost is very high; the frequency response range is low, which can only reach 10 kHz; the distance between the two platinum wires is very close, and the low frequency signal will be greatly enhanced based on the difference principle, so that the more sounds with low frequency will create a strong "interference." In addition, the microflown sensor can only measure one-dimensional vectors, and multiple microflown sensors are needed to truly detect the direction of the sound source. However, the inability to unify manufacturing will increase the cost. Further, the process of the microflown sensor itself is complicated and the yield is low, resulting the cost is very high. One can cost tens of thousands of euros or tens of thousands of yuan and can only be used in industrial or military fields. Furthermore, because of the complexity of the microflown sensor structure, it is inconvenient to miniaturize the design, which limits its promotion and application.

SUMMARY OF PRESENT INVENTION

The object of the present invention is to overcome the deficiency and defect of the prior art, by providing a small spatial sound source orientation detecting device. The device has a ultra-small space size and can accurately detect the orientation information of the sound source.

In order to achieve the above object, the present invention is to provide a small spatial sound source orientation detecting device. The device comprises a circuit board; three or more MEMS acoustic-electric transducers fixedly arranged on the circuit board and in a centrosymmetric distribution; the distance between the adjacent MEMS acoustic-electric transducers is not more than one-half of the shortest wavelength of the sound source signal; and a micro-control unit, each MEMS acoustic-electric transducer is electrically connected to the micro-control unit, respectively; the micro-control unit is to obtain the orientation information of the spatial sound source based on the acoustic signals collected by three or more MEMS acoustic-electric transducers.

According to an embodiment of the present invention, the three or more MEMS acoustic-electric transducers are all the same omnidirectional MEMS acoustic-electric transducers, and are in a centrosymmetric distribution on the circuit board, and the distance between the adjacent omnidirectional MEMS acoustic-electric transducers is not more than one-half of the shortest wavelength of the sound source signal.

According to an embodiment of the present invention, the three or more MEMS acoustic-electric transducers are three or more MEMS acoustic-electric transducers on the same plane; and the three or more MEMS acoustic-electric transducers are in a centrosymmetric distribution on the circuit board.

According to an embodiment of the present invention, the three or more MEMS acoustic-electric transducers are four or more MEMS acoustic-electric transducers disposed on different planes.

According to an embodiment of the present invention, the device further comprises a first shielding upper cover having an electromagnetic shielding function, and the first shielding upper cover and the circuit board are formed a first electromagnetic shielding region; the three or more MEMS acoustic-electric transducers and the micro-control unit are located within the first electromagnetic shielding region.

According to an embodiment of the present invention, the device further comprises a second shielding upper cover having an electromagnetic shielding function and located at a periphery of the first shielding upper cover, the second shielding upper cover and the circuit board form a second electromagnetic shielding region, the first electromagnetic shielding region is located within the second electromagnetic shielding region, and a side surface of the second shielding upper cover is provided with a lead wire hole.

According to an embodiment of the present invention, the first shielding upper cover and/or the second shielding upper cover are electrically connected to a ground line on the circuit board.

According to an embodiment of the present invention, the portion of the circuit board that is attached to each of the MEMS acoustic-electric transducers is provided with an opening, and the opening is aligned with the sound inlet hole of the MEMS acoustic-electric transducer.

According to an embodiment of the present invention, the device further comprises an sound-permeable layer disposed on one side of the circuit board where the opening is provided, and the sound-permeable layer is fixedly disposed on the second shielding upper cover.

According to an embodiment of the present invention, the sound-permeable layer is a windproof cotton or a waterproof acoustically transparent membrane.

According to an embodiment of the present invention, the sound-permeable layer is fixed to the second shielding upper cover by snapping or gluing.

Another object of the present invention is to provide a small spatial sound source orientation detecting method based on small-scale spatial sound source orientation detecting device according to the present invention, the method comprising the steps of:

S1, selecting at least three MEMS acoustic-electric transducers from three or more MEMS acoustic-electric transducers as a MEMS acoustic-electric transducer combination, and selecting equal phase points, and constructing acoustic vector signal comprises at least of two differential signals and one omnidirectional signal according to the finite difference principle;

S2, using at least two differential signals and one omnidirectional signal to obtain a data ratio between at least two sensors, to obtain one measurement result of the spatial sound source orientation;

S3. reselecting the equal phase points of the MEMS acoustic-electric transducer combination, repeating steps S1 and S2, and performing multiple measurements on the spatial sound source orientation from a plurality of different equal phase points;

S4. performing weighted average on the results of the multiple measurements to obtain accurate spatial sound source orientation detection results.

According to an embodiment of the present invention, in the step S1, two differential signals and one omnidirectional signal are preferably constructed according to the finite difference principle, and the two differential signals are in the same plane and a beam direction of the two differential signals is at an angle L, wherein the angle L ranges from [30°, 150°].

According to an embodiment of the present invention, the angle L is 90°.

According to an embodiment of the present invention, in the step S1, three differential signals and one omnidirectional signal are preferably constructed according to the finite difference principle, and the three differential signals are located in different planes, and an angle between the plane of any one of the differential signals and the plane of the other two differential signals is not less than 30° and not more than 150°.

According to an embodiment of the present invention, the three differential signals are orthogonal to each other.

Compared with the prior art, the present invention has the following advantageous effects:

(1) The small spatial sound source orientation detecting device provided by the present invention uses a plurality of MEMS acoustic-electric transducers and a dedicated processing chip to construct an ultra-small size sound transmitting device, which can not only collect the sound pressure information of the sound field, but also collect the directional information of the sound field, so as to detect the direction of the main sound source in the sound field;

(2) The small spatial sound source orientation detecting device provided by the present invention is constructed by adopting the most standard and mature omnidirectional MEMS acoustic-electric transducer, and does not need to design a new preparation process of the MEMS acoustic-electric transducer, so that the cost can be minimized and satisfied the demands for electronics consumption;

(3) The small spatial sound source orientation detecting device provided by the present invention solves the problem that the white noise gain of the differential signal is too large in the low frequency band in the case of an ultra-small package volume and the plurality of MEMS acoustic-electric transducers are so close; the problem of differential estimation error caused by frequency response and phase inconsistency between MEMS acoustic-electric transducers is also solved.

DETAILED DESCRIPTION OF PREFERRED EMBODIMENTS

The present invention will be further described in detail below with reference to the embodiments and drawings, but the embodiments of the present invention are not limited thereto.

Figure 1:
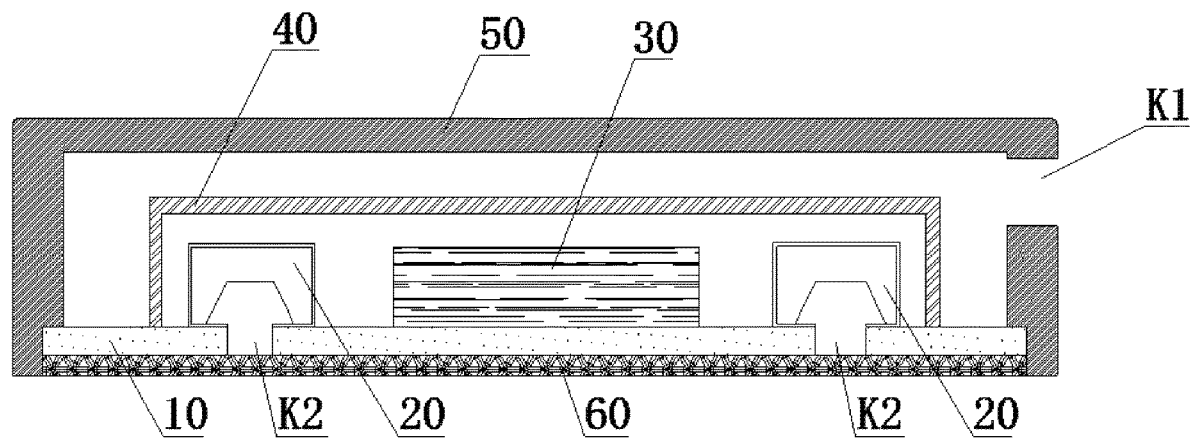
FIG. 1 is a schematic diagram showing a structure of a small spatial sound source orientation detecting device according to the present invention.

FIG. 1 is a schematic view showing of the structure of a small spatial sound source orientation detecting device according to the present invention. The device includes a circuit board 10; three or more MEMS acoustic-electric transducers 20 fixedly disposed on the circuit board 10 and in a centrosymmetric distribution. In the embodiment of the present invention, since three or more MEMS acoustic-electric transducers 20 in the actual production process cannot completely ensure a central symmetric distribution, as long as it is in a centrosymmetric distribution or the skilled person in the art considers that it is in a centrosymmetric-distribution is also within the scope of the present invention. The MEMS acoustic-electric transducer 20 is configured to convert the received sound source signal into an electrical signal, the distance between the adjacent MEMS acoustic-electric transducers 20 is not more than one-half of the shortest wavelength of the sound source signal; and a micro-control unit 30 is included, the MEMS acoustic-electric transducers 20 are electrically connected to the micro-control unit 30, respectively. In the embodiment of the present invention, each MEMS acoustic-electric transducer 20 can be connected to the micro-control unit 30 through a wire. Alternatively, the circuit board 10 may be connected to the micro-control unit 30. Surely, other electrical connections may be used. Based on the finite difference principle, the micro-control unit 30 obtains the orientation information of the spatial sound source according to the sound signals collected by the three or more MEMS acoustic-electric transducers 20. In the embodiment of the present invention, the MEMS acoustic-electric transducer 20 adopts an omnidirectional MEMS acoustic-electric transducer, and all the MEMS acoustic-electric transducers 20 in the detecting device of the present invention adopt the same existing and most mature MEMS acoustic-electrical transducers, of course, it can also use other small or miniature omnidirectional MEMS acoustic-electric transducers. Generally, the sound source signal of the external sound field may be different, and the frequency and the wavelength of the different sound source signals are different. In order to collect all the sound source signals in the sound field as much as possible, in the embodiment of the present invention, the distance between the adjacent MEMS acoustic-electric transducers 20 cannot be greater than one-half of the shortest wavelength of all sound sources. Generally, the distance between adjacent MEMS acoustic-electric transducers 20 refers to the distance between the two sound inlet holes.

In the embodiment of the present invention, the micro-control unit 30 and all the MEMS acoustic-electric transducers 20 are fixedly connected through the solder joints on the circuit board 10. In order to better realize the ultra-small space, the micro-control unit 30 is preferably fixedly soldered to the central symmetry point of the plurality of MEMS acoustic-electric transducers 30 in the embodiment of the present invention. And it can be mounted at other positions of the circuit board 10 for miniaturization. The micro-control unit 30 usually uses a dedicated processing chip (ASIC chip).

Figure 2:
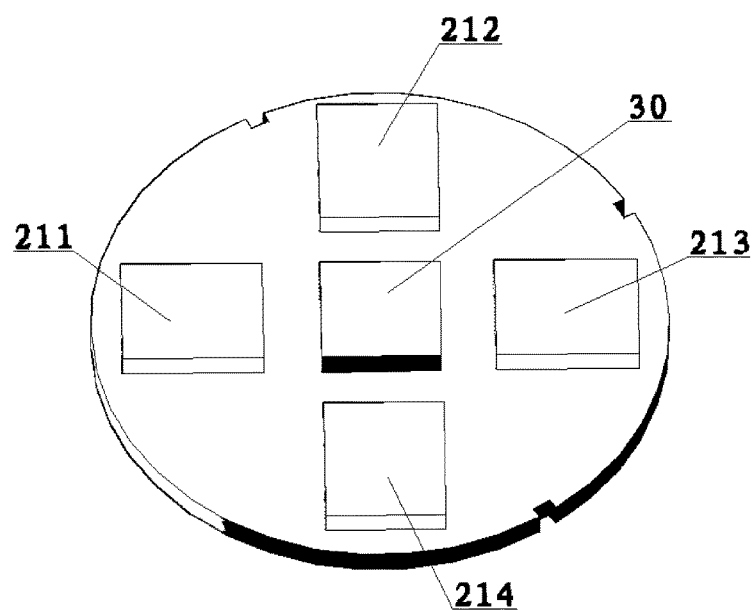
FIG. 2 is a schematic diagram of an embodiment of the present invention.
Figure 3:
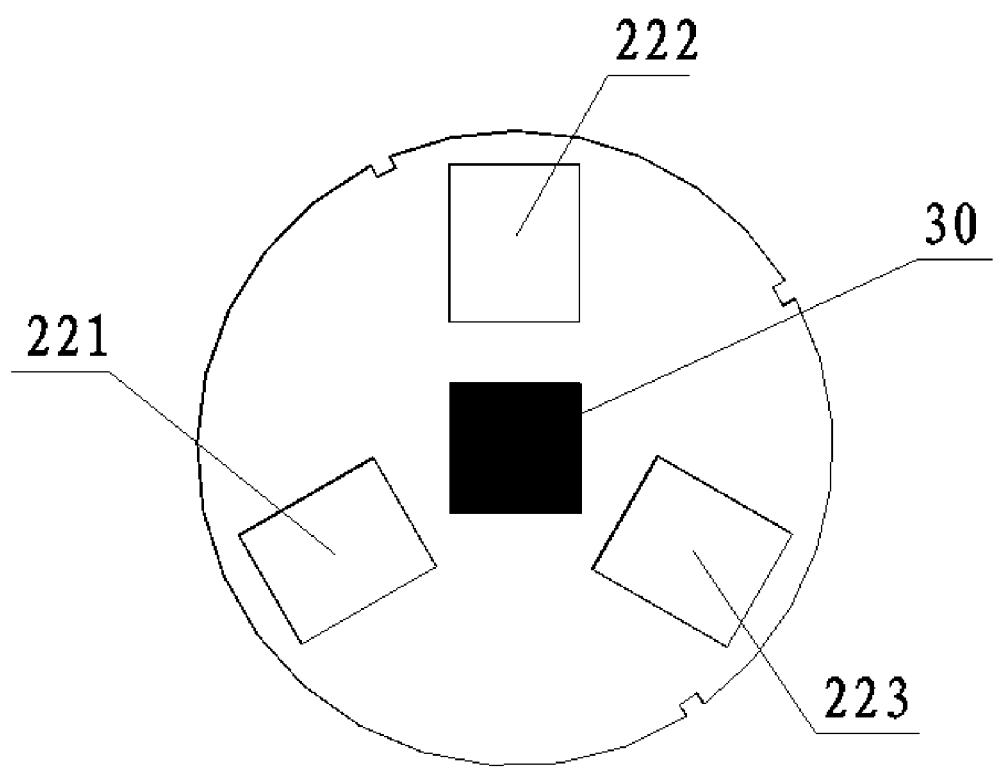
FIG. 3 is an another schematic diagram of an embodiment of the present invention.

The spatial sound source orientation detecting device of the present invention employs three or more MEMS acoustic-electric transducers 20 on the same plane, and the circuit board 10 is a conventional planar circuit board. As shown in FIG. 2, four MEMS sensors, namely a MEMS acoustic-electric transducer 211, a MEMS acoustic-electric transducer 212, a MEMS acoustic-electric transducer 213, and a MEMS acoustic-electric transducer 214, are used, and the four are in a centrosymmetric-distribution. That is, the sound inlet holes of the above four MEMS sensors are connected to form a square, and the side length of the square cannot be greater than one-half of the wavelength of the shortest wavelength sound source among all the sound sources, and a micro-control unit 30 is mounted at the center of the MEMS acoustic-electric transducer 211, the acoustic-electric transducer 212, the MEMS acoustic-electric transducer 213, and the MEMS acoustic-electric transducer 214. Similarly, as shown in FIG. 3, three MEMS sensors, namely a MEMS acoustic-electric transducer 221, a MEMS acoustic-electric transducer 222 and a MEMS acoustic-electric transducer 223, are used, and the three are also centrosymmetric distribution, that is, the sound inlet holes of the above three MEMS sensors is connected to form an equilateral triangle, and the side length of the triangle cannot be greater than one-half of the wavelength of the shortest wavelength source among all the sound sources, and a micro-control unit 30 is also mounted at the center of the MEMS acoustic-electric transducer 221, the electric transducer 222 and the MEMS acoustic transducer 223.

Another embodiment of the device provided by the present invention is that three or more MEMS acoustic-electric transducers 20 are on different planes. Of course, if multiple MEMS acoustic-electric transducers 20 are on different planes, at least four or more MEMS acoustic-electric transducers 20 are required to implement. Four or more MEMS acoustic-electric transducers 20 on different planes are also centrosymmetric distribution. For example, four MEMS acoustic-electric transducers 20 at the four corners of a regular tetrahedron are used, of course, other regular polyhedron structures, with the same omnidirectional MEMS acoustic-electric transducers 20 at each corner of the regular polyhedron, while the circuit board at this time needs to be designed to facilitate the fixed installation of all of the plurality of MEMS acoustic-electric transducers 20, may not be a planar circuit board.

In the embodiment of the present invention, the spatial sound source orientation detecting device further includes a first shielding upper cover 40 having an electromagnetic shielding function, and the first shielding upper cover 40 and the circuit board 10 constitute a first electromagnetic shielding region, and all of the MEMS acoustic-electric transducers 20, the micro-control unit 30, and other electronic components disposed on the circuit board 10 are fixedly mounted in the first electromagnetic shielding region to shield external electromagnetic radiation interference. In the embodiment of the present invention, the first shielding upper cover 40 is made of a circular, square or other miniaturized metal material, or may be made of a surface metallized material. In order to prevent the first shielding upper cover 40 from being easily oxidized, a surface metallized oxide layer may also be used.

In the embodiment of the present invention, in order to connect the device of the present invention with an external device, the detecting device is provided with a lead wire. In this case, the spatial sound source orientation detecting device of the present invention further includes a second shielding upper cover 50 of which the same shape and material as the first shielding upper cover 40, and the second shielding upper cover 50 is disposed at the periphery of the first shielding upper cover 40, and the side of the second shielding upper cover 50 is provided with a lead wire hole K1 for leading the lead wire. In order to better enhance the shielding effect of the first shielding upper cover 40 and the second shielding upper cover 50, the first shielding upper cover 40 and the second shielding upper cover 50 simultaneously or in any one of them are conducted by the grounding wire on the circuit board 10.

In the embodiment of the present invention, the portions of the circuit board 10 that are attached to each MEMS acoustic-electric transducer 20 are provided with openings K2, and the openings K2 are aligned with the sound inlet holes of the MEMS acoustic-electric transducers 20. The external sound can be converted into an electrical signal by entering the front cavity formed by the front opening of the circuit board opening K2 and the sound inlet hole of the MEMS acoustic-electric transducer 20 into the interior of the MEMS acoustic-electric transducer 20. In order to prevent dust and liquid from entering the opening K2 and affecting sound signal collection, a sound-permeable layer 60 is disposed on the side on the the circuit board 10 where the opening is located. As shown in FIG. 1, the sound-permeable layer 60 has waterproof and dustproof functions, and has excellent sound penetration effect. The sound-permeable layer 60 is usually made of windproof cotton or a waterproof sound-permeable membrane, and is fixedly mounted on the second shielding upper cover 50, and can be fixedly mounted on the second shielding upper cover 50 by snapping or gluing. Of course, other the fixing method is also possible as long as it is not easy to fall off.

In order to better solve the problem of the spatial sound source orientation detection, the present invention also provides a spatial sound source orientation detecting method based on the small spatial sound source orientation detecting device of the present invention, the method includes the following steps:

S1, at least three MEMS acoustic-electric transducers from three or more MEMS acoustic-electric transducers are selected as a MEMS acoustic-electric transducer combination, and equal phase points are selected, and constructing acoustic vector signal includes at least of two differential signals and one omnidirectional signal according to the finite difference principle. The equal phase points refer that each of the generated sub-signals of the acoustic vector signal is in-phase with the acoustic signal of the spatial point. In the embodiment of the present invention, it is preferable to obtain a differential signal by using a first-order differential microphone, preferably using a first-order dipole differential signal, and the beam pattern thereof is in an "8" shape;

S2, at least two differential signals and one omnidirectional signal are used to obtain a data ratio between at least two sensors, to obtain one measurement result of the spatial sound source orientation;

S3. the equal phase points of the MEMS acoustic-electric transducer combination are reselected, repeating steps S1 and S2, and multiple measurements are performed on the spatial sound source orientation from a plurality of different equal phase points;

S4. weighted average is performed on the results of the multiple measurements to obtain accurate spatial sound source orientation detection results.

The MEMS acoustic-electric transducer combination refers to selecting at least three constituent subsets from all MEMS acoustic-electric transducers used in implementing the device of the present invention, and if there are three omnidirectional MEMS acoustic-electric transducers, there is only one MEMS acoustic-electric transducer combination, if it is four or more omnidirectional MEMS acoustic-electric transducers, it will be four or more MEMS acoustic-electric transducer combinations according to the rules of permutation and combination.

In the following, an acoustic vector signal is constructed by selecting two differential signals and one omnidirectional signal, and an orientation of the sound source which can be detected in the two-dimensional spatial sound field is given as an example, that is, three or more MEMS acoustic-electric transducers on the same plane are used. The two differential signals are in the same plane, the signal phases are the same, and the beam pattern is at an angle. When the angle is within [30°, 150°], the two-dimensional orientation of the sound source can be effectively detected. It can achieve the highest orientation detection accuracy when the angle is 90° under other conditions are the same. In the embodiment of the present invention, the definition and calculation manner of the "inter-sensor data ratio" are as follows. The omnidirectional signal in the sound vector signal is $o(t)=s(t)$, such that after any direction is specified as 0° on the plane of the two differential signals, the angle between the two differential signals and the 0° direction is known to be $\theta_{s1}$ and $\theta_{s2}$, respectively. And the two differential signals can be represented as $u(t)=s(t)\cos(\theta-\theta_{s1})$, $v(t)=s(t)\cos(\theta-\theta_{s2})$. The discrete Fourier transform of $o(t)$, $u(t)$, $v(t)$ is $O(\omega)$, $U(\omega)$, $V(\omega)$, and the inter-sensor data ratio (ISDR) containing the sound source orientation information is defined as:

$$I_{uo}(\omega) = \frac{U(\omega)}{O(\omega)} = \cos(\theta - \theta_{s1}) \quad (1)$$

$$I_{vo}(\omega) = \frac{V(\omega)}{O(\omega)} = \cos(\theta - \theta_{s2}) \quad (2)$$

Since the $\theta_{s1}$ and $\theta_{s2}$ are known angles respectively, and when the angle L between the $\theta_{s1}$ and $\theta_{s2}$ is in the range of [30°, 150°], it can be solved by jointly solving the inverse trigonometric functions of equations (1) and (2), namely the estimate value $\theta_i$ of the orientation angle of the sound source can be uniquely determined.

For example, when $\theta_{s1}=90°$, $\theta_{s2}=120°$, at this time, the angle between the $\theta_{s1}$ and $\theta_{s2}$ is 30°; when $\theta_{s1}=10°$, $\theta_{s2}=160°$, at this time, the angle between the $\theta_{s1}$ and $\theta_{s2}$ is 150°. The above formula can also obtain the estimate value $\theta_i$ that uniquely determines the orientation angle of the sound source. However, when the angle between the $\theta_{s1}$ and $\theta_{s2}$ is 90°, the detected sound source orientation is the best, that is, when the optimal example of the two differential signals is orthogonal, the equations (1) and (2) can be rewritten as:

$$I_{uo}(\omega) = \frac{U(\omega)}{O(\omega)} = \cos(\theta) \quad (3)$$

$$I_{vo}(\omega) = \frac{V(\omega)}{O(\omega)} = \sin(\theta) \quad (4)$$

By jointly solving the inverse trigonometric functions of equations (3) and (4), the estimated value $\theta_i$ of the orientation angle of the sound source can be uniquely determined.

In the previous step S3, since the selected MEMS acoustic-electric transducer combination and the equal phase point are different every time, the estimated values of the sound source orientation angles are also different. The estimated value $\theta_i$ of the sound source orientation angles for each measurement is recorded as i=1, 2, . . . , M, and the final estimate value of the orientation of the sound source is:

$$\overline{\theta_i} = \frac{\sum_{i=1}^{M} w_i \theta_i}{M} \quad (5)$$

Wherein, $w_i$ is the weight of each measurement, for convenience, it can take as $w_i=1$.

Figure 4:
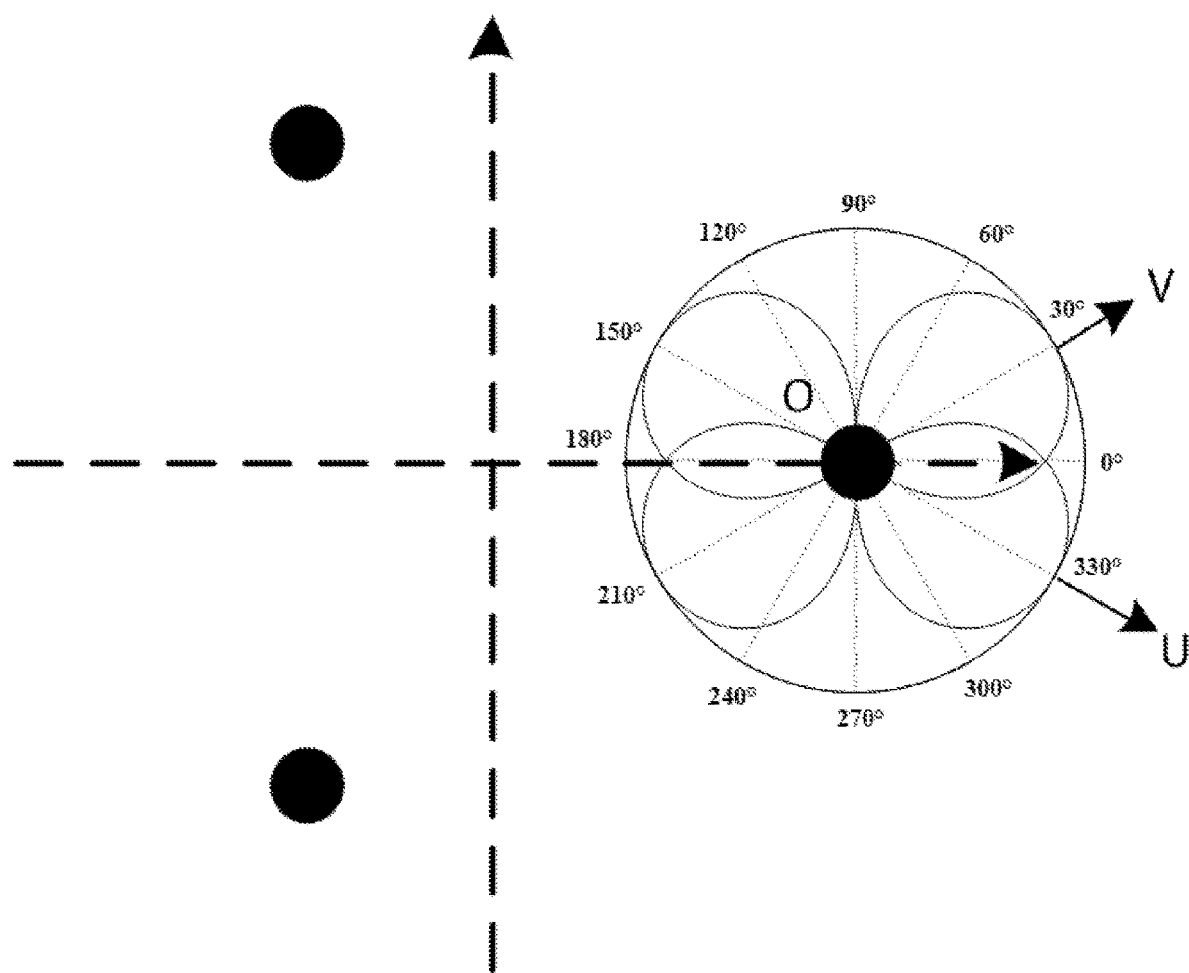
FIG. 4 (a), (b), (c) are schematic diagrams of embodiments of the present invention.
Figure 4:
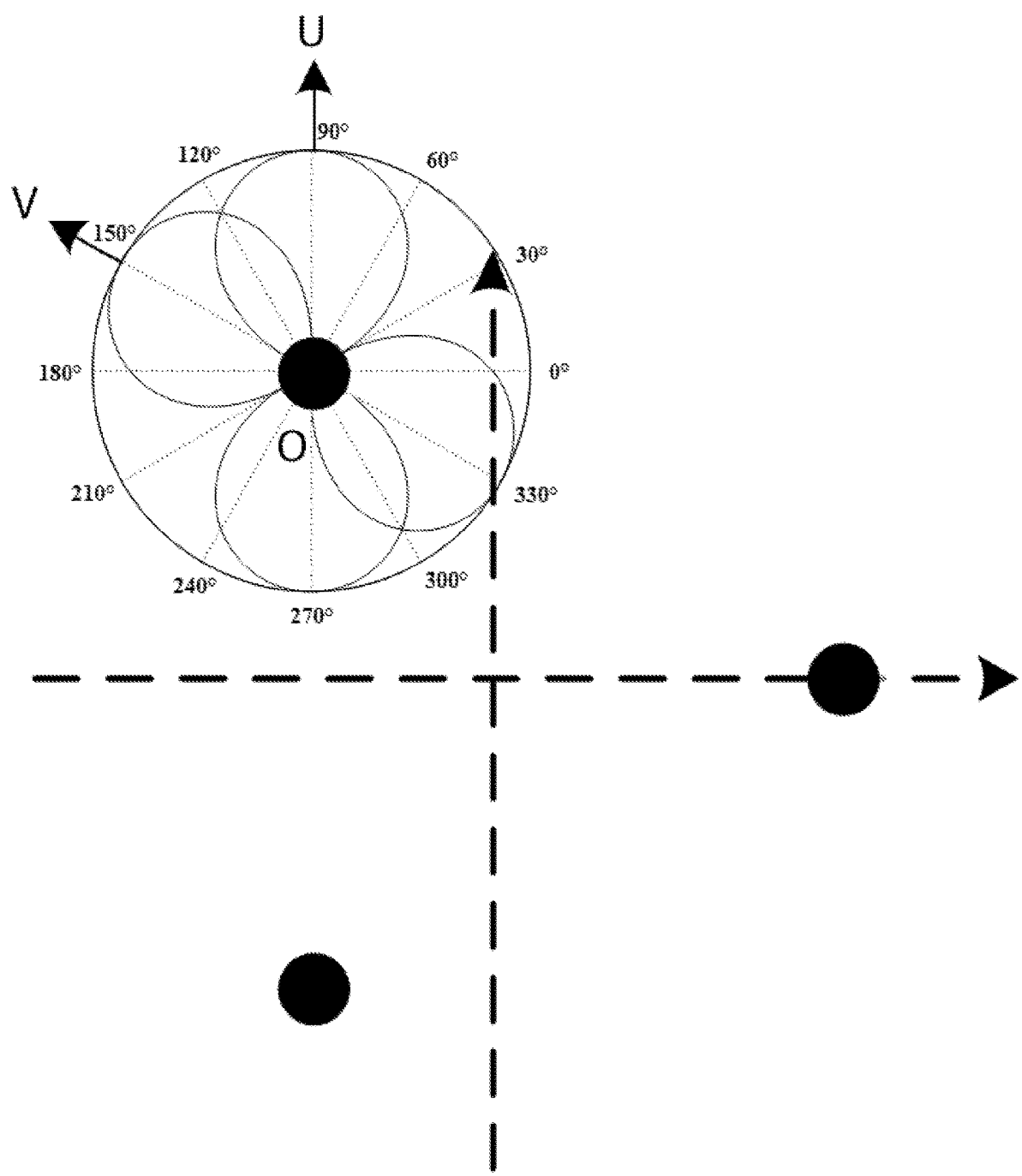
Figure 4:
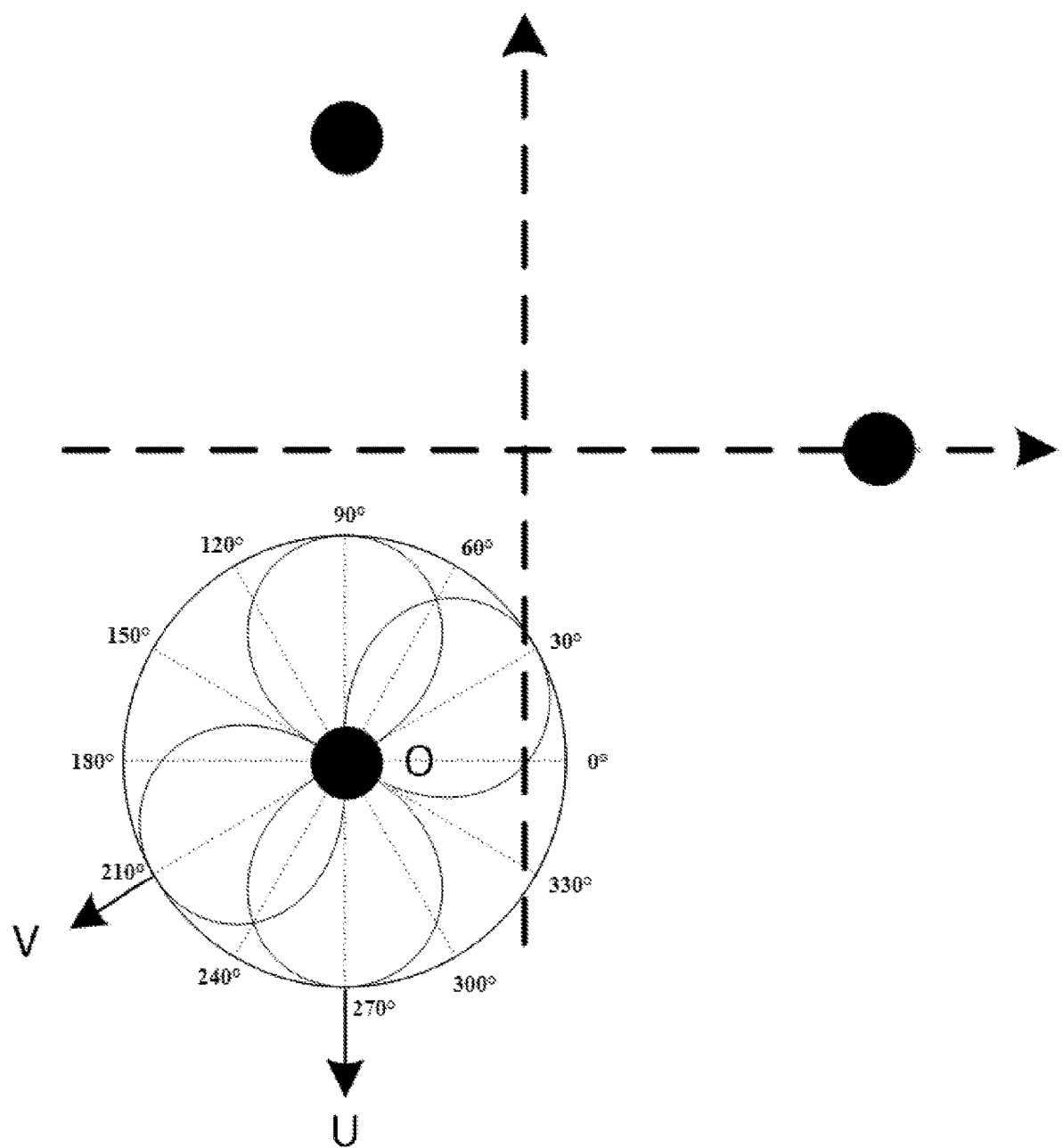
Figure 5:
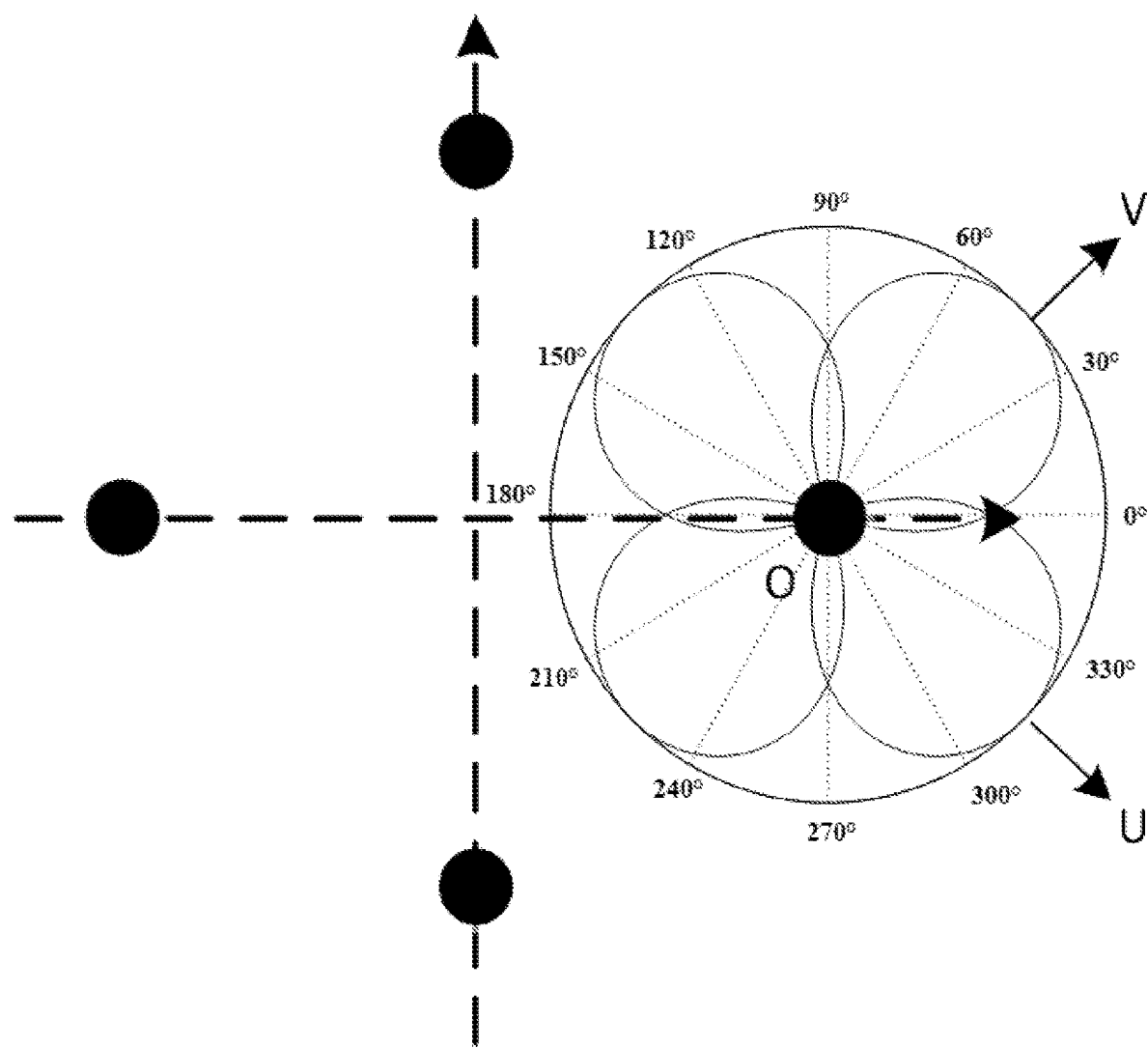
FIG. 5 (a), (b), (c), (d) are schematic diagrams of embodiments of the present invention.
Figure 5:
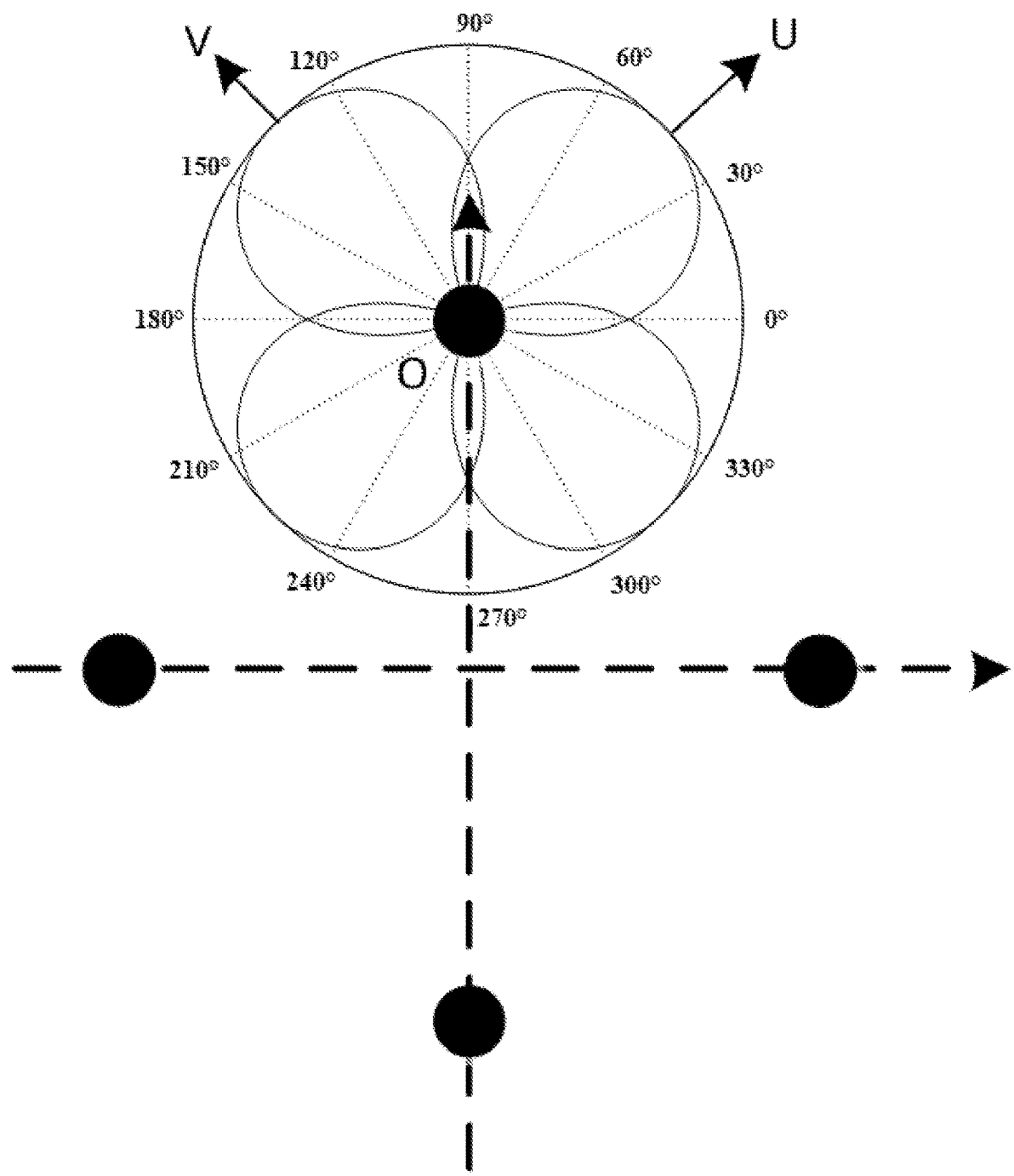
Figure 5:
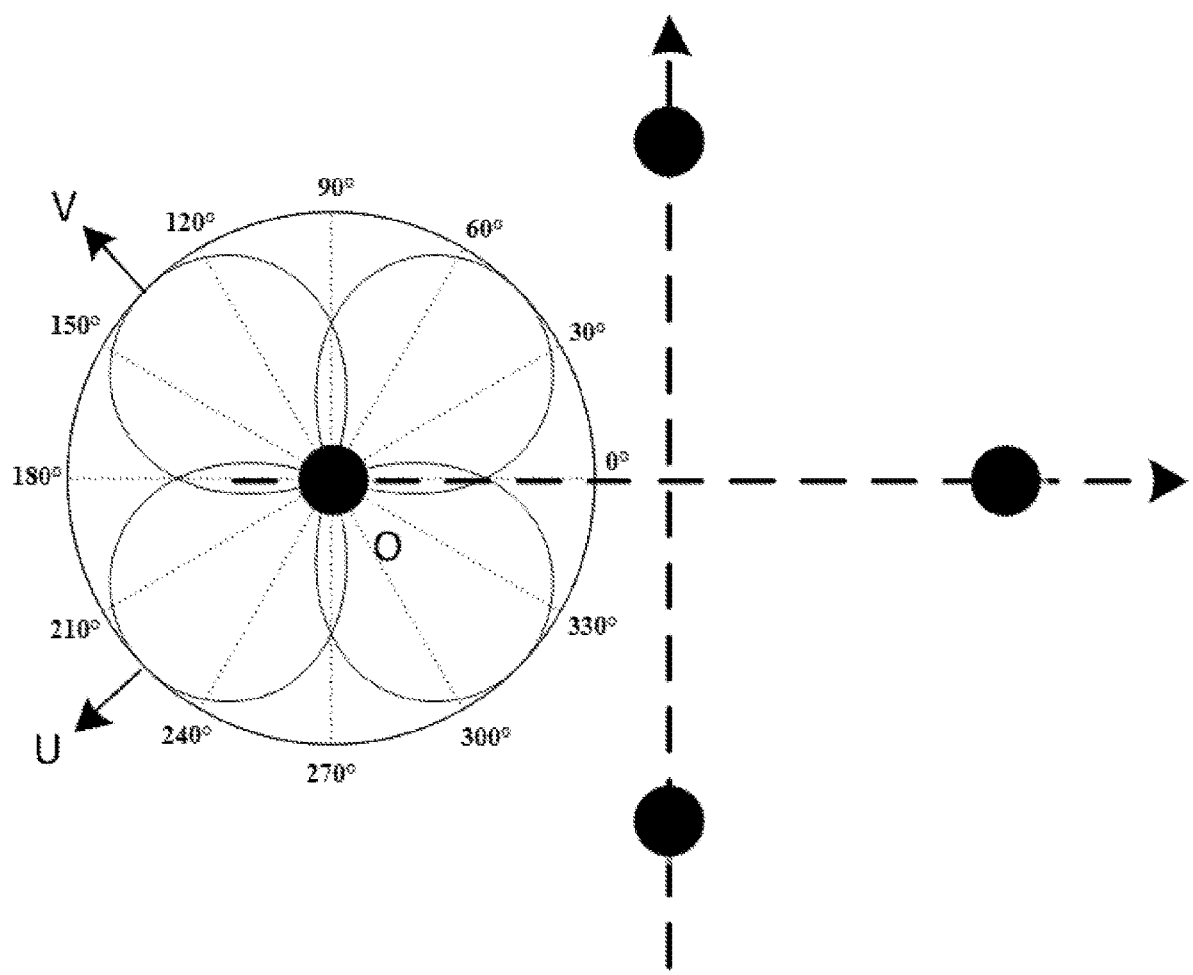
Figure 5:
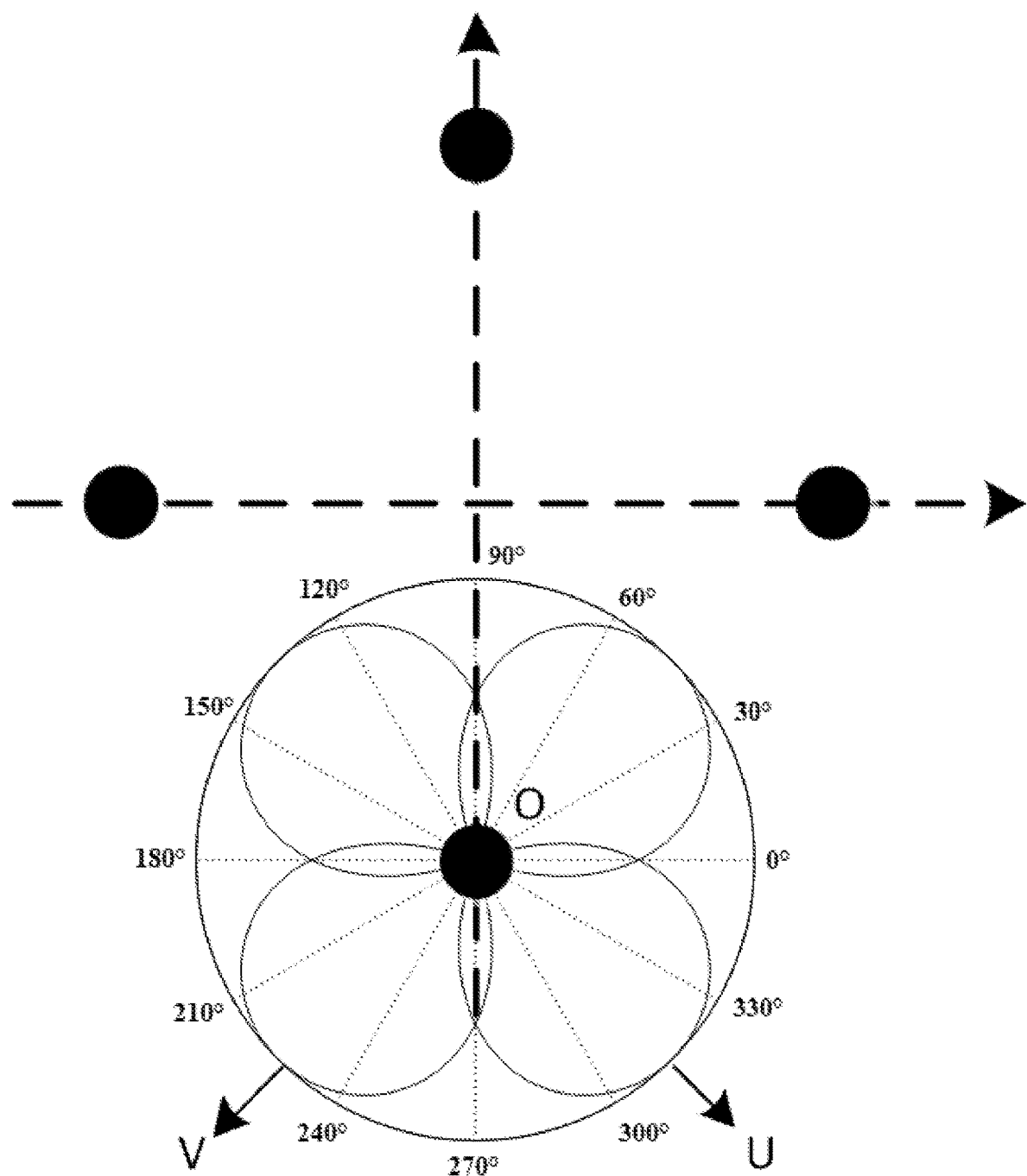

In the embodiment of the present invention, three MEMS acoustic-electric transducers on the same plane can be used to generate three sets of acoustic vector signals, and the orientation of the sound source is measured three times. As shown in FIG. 4(a), it shows a beam direction pattern with the rightmost acoustic-electric transducer as the equal phase point (the ASIC chip is hidden. Only the spatial positional relationship of the MEMS acoustic-electric transducer is retained.). As shown in FIG. 4(b), it shows a beam direction pattern with the acoustic-electric transducer on the upper side as an equal phase point. As shown in FIG. 4(c), it shows a beam direction pattern with the acoustic-electric transducer on the lower side as an equal phase point. Similarly, in an embodiment using four planar MEMS acoustic-electric transducers, four sets of acoustic vector signals can be generated, and the orientation of the sound source is measured four times, as shown in FIG. 5(a), it is a beam direction pattern with the rightmost acoustic-electric transducer as an equal phase point (also ASIC chip is hidden, only retaining the spatial positional relationship of the MEMS acoustic-electric transducer). As shown in FIG. 5(b), it is a beam direction pattern with the uppermost acoustic-electric transducer as an equal phase point. As shown in FIG. 5(c), it is a beam direction pattern with the leftmost acoustic-electric transducer as an equal phase point. As shown in FIG. 5(d), it is a beam direction pattern with the lowest acoustic-electric transducer as an equal phase point.

In the embodiment of the present invention, according to the implementation principle of the two-dimensional plane, those skilled in the art may also use two or more differential signals that are not on the same plane to detect the three-dimensional direction information of the sound source, that is, simultaneously detecting the orientation and elevation of the sound source. When there are more than two differential signals available, for example, as long as the three differential signals are in different planes, the azimuth and elevation angles of the sound source can be detected simultaneously, and the angle of the planes of any one differential signal and the other two differential signals should be greater than or equal to 30° and not more than 150°. And when the three differential signals are orthogonal to each other, the system performance is the best, and the highest orientation detection accuracy can be obtained when other conditions are the same, because of the principle of the orientation detection thereof is similar to the principle of orientation detection in the two-dimensional plane, and it will not be described here for brevity.

In summary, the small spatial sound source orientation detecting device of the present invention uses a plurality of MEMS acoustic-electric transducers and a dedicated processing chip to construct an ultra-small sound transmitting device, which can not only collect the sound pressure information of the sound field, but also collect the directional information of the sound field to detect the direction of the main sound source in the sound field. At the same time, the device solves the problem of excessive white noise gain of the differential signal in the low frequency band, also solves the difference estimation error problem caused by the frequency response and phase inconsistency between the MEMS acoustic-electric transducers. In addition, the small spatial sound source orientation detecting device of the present invention is constructed by adopting the most standard and mature omnidirectional MEMS acoustic-electric transducer, and does not require to design a new MEMS microphone preparation process, and the cost can be minimized to meet the demand of electronics consumption.

The above embodiments are preferred embodiments of the present invention, but the embodiments of the present invention are not limited to the above embodiments, and any other changes, modifications, substitutions, combinations, and simplification made without departing from the spirit and scope of the present invention should all be equivalent replacements and are within in the scope of the present invention.

I claim:

1. A small spatial sound source orientation detecting device, comprising a circuit board;
   three or more MEMS acoustic electric transducers fixedly arranged on the circuit board and in a centrosymmetric distribution; wherein a distance between adjacent MEMS acoustic-electric transducers is not more than one-half of a shortest wavelength of a sound source signal; the centrosymmetric distribution indicates that the three or more MEMS acoustic electric transducers are symmetric with respect to a central point on the circuit board;
   and a micro-control unit, wherein each MEMS acoustic-electric transducer is electrically connected to the micro-control unit, respectively; and wherein
   the micro-control unit is configured to obtain an orientation information of spatial sound source based on acoustic signals collected by the three or more MEMS acoustic-electric transducers;
   the micro-control unit and the three or more MEMS acoustic-electric transducers are fixedly connected through solder joints on the circuit board.

2. The small spatial sound source orientation detecting device according to claim 1, wherein the three or more MEMS acoustic-electric transducers, are all the same omnidirectional MEMS acoustic-electric transducers, and are in a centrosymmetric distribution on the circuit board, and the distance between adjacent omnidirectional MEMS acoustic-electric transducers is not more than one-half of the shortest wavelength of the sound source signal.

3. The small spatial sound source orientation detecting device according to claim 2, wherein the three or more MEMS acoustic-electric transducers are three or more MEMS acoustic-electric transducers on a same plane; and the three or more MEMS acoustic-electric transducers are in a centrosymmetric distribution on the circuit board.

4. The small spatial sound source orientation detecting device according to claim 3, wherein the device further comprises a first shielding upper cover having an electromagnetic shielding function, and the first shielding upper cover and the circuit board form a first electromagnetic shielding region; the three or more MEMS acoustic-electric transducers and the micro-control unit are located within the first electromagnetic shielding region.

5. The small spatial sound source orientation detecting device according to claim 4, wherein the device further comprises a second shielding upper cover having an electromagnetic shielding function and located at a periphery of the first shielding upper cover, the second shielding upper cover and the circuit board form a second electromagnetic shielding region, the first electromagnetic shielding region is located within the second electromagnetic shielding region, and a side surface of the second shielding upper cover is provided with a lead wire hole.

6. The small spatial sound source orientation detecting device according to claim 5, wherein the first shielding upper cover and/or the second shielding upper cover are electrically connected to a ground line on the circuit board.

7. The small spatial sound source orientation detecting device according to claim 5, wherein a portion of the circuit board that is attached to each of the MEMS acoustic-electric transducers is provided with an opening, and the opening is aligned with a sound inlet hole of the MEMS acoustic-electric transducer.

8. The small spatial sound source orientation detecting device according to claim 5, wherein the device further comprises a sound-permeable layer disposed on one side of the circuit board where the opening is provided, and the sound-permeable layer is fixedly disposed on the second shielding upper cover.

9. The small spatial sound source orientation detecting device according to claim 8, wherein the sound-permeable layer is a windproof cotton or a waterproof sound-permeable membrane.

10. The small spatial sound source orientation detecting device according to claim 8, wherein the sound-permeable layer is fixed to the second shielding upper cover by snapping or gluing.

11. The small spatial sound source orientation detecting device according to claim 2, wherein the three or more MEMS acoustic-electric transducers are four or more MEMS acoustic-electric transducers disposed on different planes.

12. A spatial sound source orientation detecting method of a small spatial sound source orientation detecting device according to claim 1, wherein the method comprises:
- S1, selecting at least three MEMS acoustic-electric transducers from three or more MEMS acoustic-electric transducers as a MEMS acoustic-electric transducer combination, and selecting equal phase points, and constructing acoustic vector signal comprises at least of two differential signals and one omnidirectional signal according to a finite difference principle;
- S2, using the at least two differential signals and the one omnidirectional signal to obtain a data ratio between at least two sensors, to obtain one measurement result of a spatial sound source orientation;
- S3, reselecting equal phase points of the MEMS acoustic-electric transducer combination, repeating steps S1 and S2, and performing multiple measurements on the spatial sound source orientation from a plurality of different equal phase points;
- S4, performing weighted average on results of the multiple measurements to obtain accurate spatial sound source orientation detection results.

13. The spatial sound source orientation detecting method according to claim 12, wherein in the step S1, the two differential signals and the one omnidirectional signal are constructed according to the finite difference principle, and the two differential signals are in a same plane and a beam direction of the two differential signals is at an angle L, wherein the angle L ranges from 30° to 150°.

14. The spatial sound source orientation detecting method according to claim 13, wherein the angle L is 90°.

15. The spatial sound source orientation detecting method according to claim 12, wherein in the step S1, three differential signals and one omnidirectional signal are constructed according to the finite difference principle, and the three differential, signals are located in different planes, and an angle, between a plane of any one of the differential signals and a plane of the other two differential signals is not less than 30° and not more than 150°.

* * * * *